United States Patent [19]

Motozawa et al.

[11] 3,970,562

[45] July 20, 1976

[54] AGGREGATION TREATMENT APPARATUS FOR WASTE WATER

[75] Inventors: Saburo Motozawa; Hiroyoshi Itoga; Hirobumi Wada; Hiromasa Marukawa, all of Tokyo, Japan

[73] Assignee: Tokyo Denki Kagaku Kogyo Kabushiki Kaisha (TDK Electronics Co., Ltd.), Tokyo, Japan

[22] Filed: Dec. 30, 1974

[21] Appl. No.: 537,367

[30] Foreign Application Priority Data
Jan. 11, 1974   Japan................................ 49-6063

[52] U.S. Cl............................. 210/205; 210/220
[51] Int. Cl.² ..................... B01D 21/26; C02B 1/10
[58] Field of Search ................... 210/42, 44, 45, 47, 210/192, 199, 202, 203, 220, 221

[56] References Cited
UNITED STATES PATENTS

| | | | |
|---|---|---|---|
| 599,009 | 2/1898 | Palmer et al...................... | 21/192 X |
| 1,131,067 | 3/1915 | Lanameta......................... | 210/47 X |
| 3,525,437 | 8/1970 | Kaesing et al. .................... | 210/221 |
| 3,846,300 | 11/1974 | Inoue.................................. | 210/47 |

*Primary Examiner*—John Adee
*Attorney, Agent, or Firm*—William J. Daniel

[57] ABSTRACT

An aggregation treatment apparatus for waste water which comprises a suspending section for mixing particles of metal, metallic oxide or sintered metallic oxide into feed water such as sewage and drainage, and forming a slurry; an electrically aggregating section for the slurry which is installed separately from the suspending section; and a separating section which is formed integrally with the suspending section, and separating the particles from flocks in the treated water, returning the particles into the suspending section and discharging the treated water from the upper portion. The slurry is pumped from the suspending section to the electrically aggregating section. An electric field is applied to the slurry by means of an electrode tube in the electrically aggregating section, colloidal particles in the feed water is thereby aggregated to the added particles to form flocks and the treated water is then passed to the separating section.

7 Claims, 3 Drawing Figures

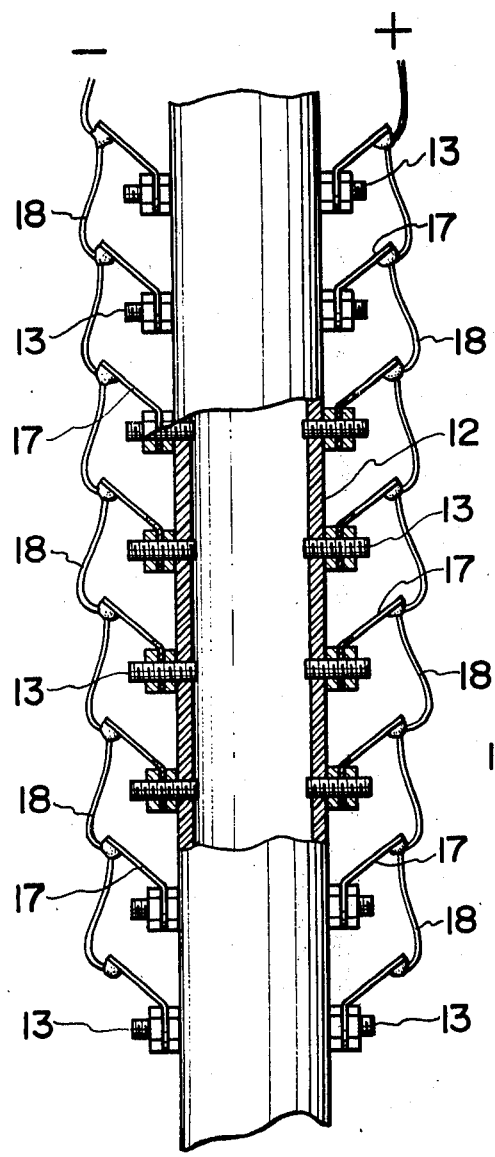
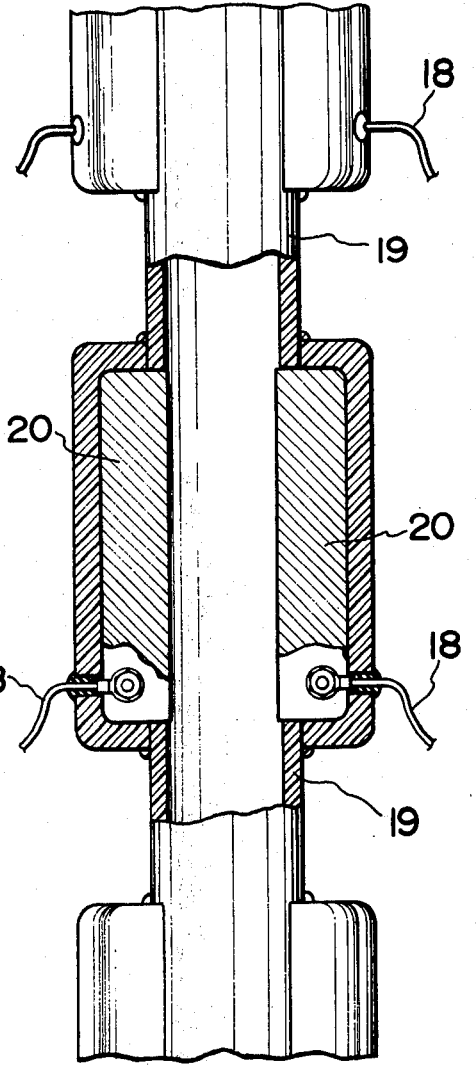

3,970,562

AGGREGATION TREATMENT APPARATUS FOR WASTE WATER

BACKGROUND OF THE INVENTION

This invention relates to an aggregation treatment apparatus for waste water. More particularly, the invention relates to a waste water treatment apparatus to form clear treated water by eliminating foreign matter in the waste water, in which the colloidal particles in the waste water can be effectively aggregated and then separated through a liquid-solid separation process.

There is so-called waste water of every sort and kind such as spent water, sewage, foul water and the like and a wide variety of methods and apparatus have been developed for the treatment of such waste water.

In case the waste water is a hydrophobic colloidal solution, it can be treated by neutralizing the electric charges of the colloidal particles with some appropriate measures and for such purpose, there are heretofore known an aggregating method by chemical treatment and a cohesive sedimentation method by electrophoresis.

The inventors of the present application have previously proposed a method and apparatus for electrophoretic aggregation, in which a third material such as iron powder, ferrite powder or iron sand, having an electric charge in water opposite to the colloidal particles in the waste water, is added to the colloidal waste water to form a high concentration suspension, then electrophoretically moving the colloidal particles and the third material toward each other by applying a high electric field using insoluble electrodes made of graphite, ferrite or the like, thus aggregating the colloidal particles on the surfaces of the third material particles, then removing the aggregated colloidal particles from the third material to form flocks and subjecting the flocks to a liquid-solid separation process in a settling pond (Japanese Patent Laid-open Publication No. 27,565 of 1973). Further, as the apparatus for carrying out this electrophoretic aggregating method, the inventors of the present application have also proposed an apparatus in which a plurality of electrodes, each having a small surface area, are provided in a treating tank for settling and separating (Japanese Patent Laid-open Publication No. 33,460 of 1973). This apparatus has, however, some disadvantages in that the electrodes must be interchanged as they are liable to wear, such interchange being troublesome, and that free passage of the untreated feed water through the treatment tank, commonly known as short pass, occurs.

In the present invention, the above-mentioned disadvantages and inconveniences have been eliminated.

BRIEF SUMMARY OF THE INVENTION

The primary object of the present invention is, accordingly, to provide an improved aggregation treatment apparatus for waste water by electrophoresis in which the interchange of the electrode section and the electrode pipe is facilitated.

Another object of the present invention is to provide an aggregation treatment apparatus for waste water by electrophoresis in which there is no fear of free passage of untreated feed water, i.e. so-called short pass, through the treatment vessel.

A further object of the present invention is to provide an aggregation treatment apparatus for waste water by electrophoresis in which the feed water can be sufficiently treated by only one passage through an electric field within an electrode tube.

BRIEF DESCRIPTION OF THE DRAWINGS

Other objects and effects of the present invention will become apparent from the following described embodiments with reference to the accompanying drawings, in which:

FIG. 2 is a partially cross-sectional side elevation of an electrode tube, and FIG. 3 is a partially cross-sectional side elevation of a modified embodiment of the electrode tube as shown in FIG. 2.

DETAILED DESCRIPTION OF THE INVENTION

Figure 1:
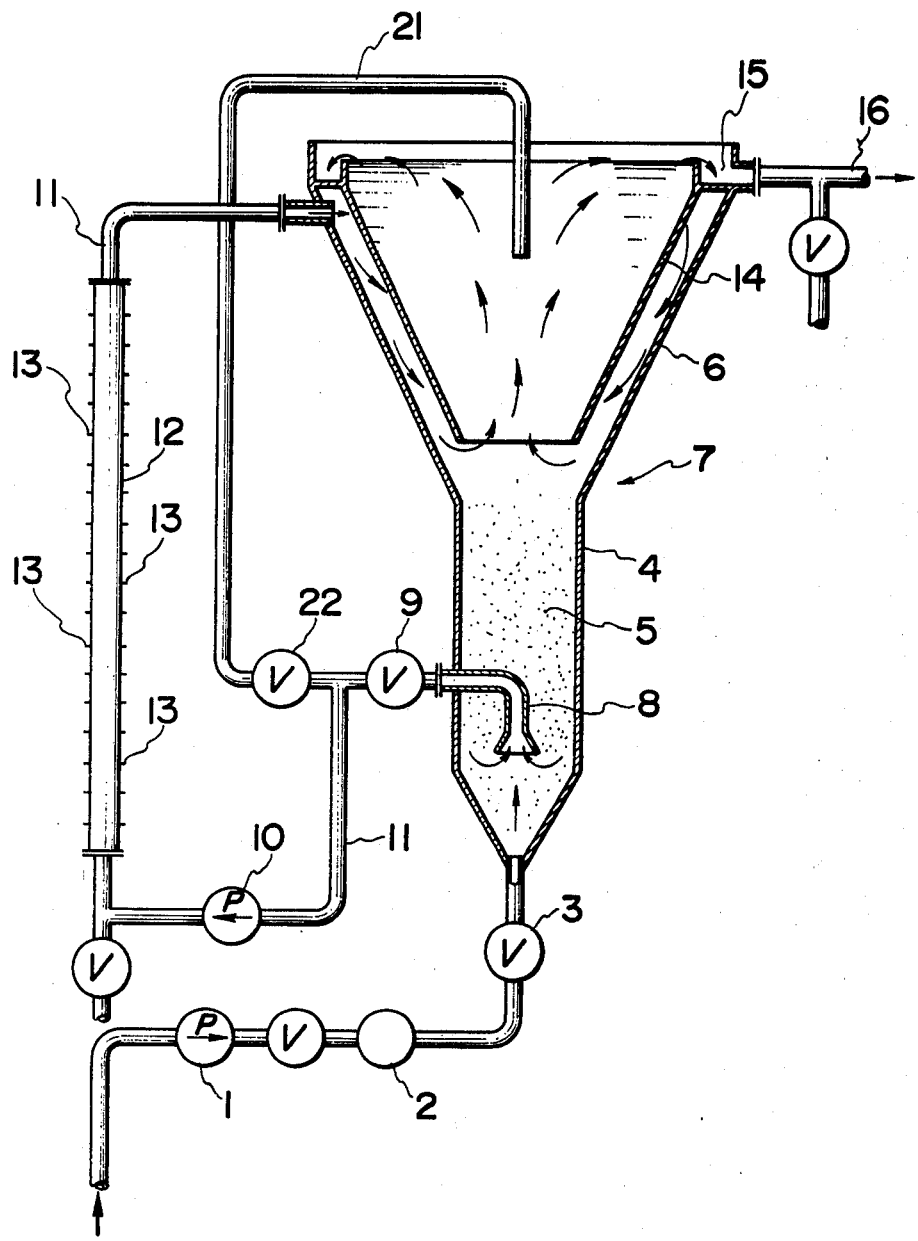
FIG. 1 is a schematic illustration of the entire structure of a preferred embodiment of the aggregation apparatus for waste water according to the present invention.

Referring now to the accompanying drawings, the embodiment of the present invention will be explained in detail.

As stated in the above, FIG. 1 shows the overall structure of the aggregation treatment apparatus of the present invention, in which the feed water is drawn by a pump 1 from a drainage, water pit or the like and then pumped into the lower portion of a suspending section 4 through a flow meter 2 and an automatic valve 3. Proper amount of particles 5 of a third material which, having an opposite electric charge to the charge of the coloidal particles in the feed water, is added to the suspending section 4 and as the third material, metal powder, metallic oxide or sintered metallic oxide such as iron powder, iron sand or ferrite powder may be employed. Thus, the powder is suspended in the pumped feed water within the suspending section 4 to form a so-called slurry. The suspending section 4 is generally constructed in a cylindrical configuration. However, it may be constructed in any convenient shape. The opening area is to be determined so as to thoroughly mix and well-suspend the third material powder by the upward flow of the pumped feed water. Further, a treatment vessel 7 is mainly composed of a suspending section 4 and an inverted conical separating section 6 installed on the upper end of the suspending section 4.

The slurry is then transferred to an electrode tube 12 through a suction pipe 8 inserted into the suspending section 4, an automatic valve 9, a slurry pump 10 and a transfer pipe 11. This electrode tube 12 is provided with a plurality of electrodes 13 in opposite relation to each other along the whole length of the tube. When an electric field is applied to the slurry by these electrodes 13, the colloidal particles in the waste water and the metallic particles 5 or the like are electrophoretically moved toward each other to form flocks by aggregation. Thus, treated water is then passed to the upper portion of the conical separating section 6 on the treatment vessel 7 by the transfer pipe 11 in a tangential direction and the flocks spirally flow down between a partition cylinder 14 within the separating section 6 and the inner wall of the separating section 6. During this descent, the particles 5 of the flocks gather at the peripheral portion by centrifugal force and slide down on the inner wall of the separating section 6 to the suspending section 4. Furthere, the particles 5 are again suspended in the water by the upward current and then drawn by the suction pipe 8 to repeat the above-mentioned cycle. Meanwhile, the flocks, separated from the particles 5, flow up into the separating section 6, then flow into the overflow gutter 15 provided at the upper edge of the separating section 6 together with the treated water and finally are led to a settling pond (not shown) through the outlet 16. Thereby, the liquid-solid separation can be carried out.

The embodiment of the separating section 6 shown in the drawing is an inverted conical shape. However, the shape of this section is not restricted to such configuration. For example, a liquid cyclone, a slant plate separator and the like may be used.

FIG. 2 is a partially cross-sectional side view of the electrode tube 12 showing the structure thereof. The electrode tube 12 is generally constructed of an insulating material such as polyvinyl chloride resin, acrylic resin or Teflon (trademark of polytetrafluoroethylene), and the wall portion of the electrode tube 12 is provided with a plurality of screw holes which are positioned opposite one another. A plurality of stud bolts 13 are screwed into the screw holes, respectively, and the tip surfaces of the stud bolts 13 are utilized as the electrode surfaces. The electrode bolts 13 are made of insoluble and electroconductive materials such as graphite, ferrite, stainless steel, copper, titanium or platinum. Further, numeral 17 indicates terminals fixed to the electrodes 13 and numeral 18 indicates wirings. One side of the thus formed electrodes 13 is applied with the same DC polarity and the other side with the opposite DC polarity as in usual cases. AC voltage (commercial power 50 – 60 Hz) can also be used. However, the effect of aggregation is somewhat reduced.

FIG. 3 shows another modified embodiment of the electrode tube. In the drawing, numeral 19 indicates the electrode tube and numeral 20 indicates plate electrodes. A plurality of plate electrodes 20 are fitted in opposed relation on the electrode tube 19 and the front end of each plate electrode serves as the electrode surface. The sections of the electrode tubes 12 and 19 shown in the drawings are circular. However, they may be oval or any other shape. What is important is that the electrode tube has a structure such, that it can produce a uniform electric field within the tube by the combination of the shape and disposition of the electrodes.

Further, numeral 21 in FIG. 1 indicates a water supply pipe which connects the separating section 6 to the automatic valve 9 and the slurry pump 10 and the pipe 21 is provided with an automatic valve 22. When the apparatus of the present invention is stopped, the above water supply pipe 21 and automatic valve 22 are used for removing the particles 5 in the pipes and the pump. That is, when the operation is stopped, the automatic valve 9 is closed and another automatic valve 22 is simultaneously opened to draw the treated water into the upper portion of the separating section 6 through the water supply pipe 21, thereby the slurry suspension within the slurry pump 10, the electrode tube 12 and other pipes can be displaced with the treated water. After the displacement, the slurry pump 10 is stopped and the feed water pump 1 is then stopped with the simultaneous closing of the automatic valve 3 to finish the operation of the treatment.

In the waste water treatment by using the apparatus of the present invention, it is necessary to select the third material as the particles 5 which must have an electric charge opposite that of the colloidal particles in the waste water passing the electric field. The particles 5 of the third material is not, however, restricted to the foregoing ones and it may be selected properly according to the kind of waste water to be treated. Further, the concentration of the suspension is determined by the supply of feed water and the amount of the particles 5 and in either case, the concentration of the suspension can be stably maintained during the operation. For instance, the suspension concentration of 60% by volume is obtained by using the particle material of 5.5 in specific gravity and 0.15 millimeter in average particle size.

The standard treating capacity of the present apparatus is about 2 m³/hr. However, it may be increased to 4 m³/hr by changing the specifications of the slurry pump and the electrode section. Further, the treating capacity varies according to the relative difficulty of the waste water treatment. The supply of feed water can be controlled within the range of 0 to 4 m³/hr by the regulation of the feed water pump.

In the treatment of the waste water by using the apparatus of the present invention, the waste water can be treated continuously by opening the feed water pump, or it may be circulated in the apparatus by closing the feed water pump.

In addition to the use of the apparatus of the present invention simply for the waste water treatment, it can be used as several testing devices on the slurry transfer because the slurry concentration is stable. For example, it may be used for efficiency tests for a slurry pump, the head loss in a pipe and the like.

To further illustrate this invention and not by way of limitation, the following example is given.

EXAMPLE

Test of waste water aggregation treatment

Using the apparatus shown in FIG. 1 for waste water aggregation treatment, the experiment was carried out with regard to the waste water of coating material discharged from the process of coated paper manufacture. As for the electrode tube, a similar one as shown in FIG. 2 was used.

The specification of the waste water treatment apparatus were as follows:

| | | |
|---|---|---|
| Length of electrode tube | : | 300 cm |
| Diameter of electrode tube | : | 5 cm |
| Distance of electrodes | : | 2.5 cm |
| Maximum diameter of separating section | : | 100 cm |
| Height of treating vessel | : | 220 cm |

With the above apparatus, 2 m³/hr of waste water was fed and the treatment was carried out for 6 hours by adding 30% by volume of iron powder as the particles of the third material. Though the suspended materials in the waste water could not be specified, it is sure that the waste water contained a large quantity of very fine particles such as white clay, titanium white and calcium carbonate and it also contained organic materials such as case in and some of dispersing agents. Therefore, it had been regarded that the aggregation of the contaminants in the waste water of this kind was very difficult to treat.

By using the apparatus of the present invention, however, the above waste water was treated satisfactorily, the results of which is shown in the following Table 1.

Table 1

| Item | Feed Water | Treated Water |
| --- | --- | --- |
| SS (ppm) | 1000 – 1200 | 14 |
| COD (ppm) | 160 | 17 |

Notes:
1. Results are averages in the 6 hours' operation.
2. SS: Suspended Solid; COD: Chemical Oxygen Demand.

Further, with the same apparatus and conditions of the above, a similar test was carried out with respect to the ordinary sewage (domestic waste water). The results of this test are shown in the following Table 2.

Table 2

| Item | Feed Water | Treated Water |
| --- | --- | --- |
| SS (ppm) | 100 | 10 – 20 |
| pH | 6.0 | 8.0 |
| Fe (ppm) | 5.2 | 0.07 |
| Zn (ppm) | 1.64 | 0.08 |
| Cu (ppm) | 0.21 | 0.02 |
| Cr (ppm) | 0.06 | 0.02 |
| Ni (ppm) | 1.15 | 0.03 |
| Pb (ppm) | 0.05 | 0.01 |
| Mn (ppm) | 0.32 | 0.01 |
| COD (ppm) | 108 | 57 |

In view of the above disclosure and results, the advantages and excellence of the apparatus of the present invention will be understood. It should be emphasized, however, that the specific embodiments described and shown herein are intended as merely illustrative and in no way restrictive of the invention.

What is claimed is:

1. In a continuous apparatus for aggregating suspended colloidal solids in waste water comprising a suspending stage in which metallic particles of metal, metal oxide or sintered metal oxide carrying an electrical charge opposite to that on said solids are suspended in a feed flow of said waste water; an electrical aggregating stage in which said feed flow with said particles suspended therein is passed between oppositely charged electrodes to flocculate said oppositely charged particles and colloidal solids; and a separating stage in which the metallic particles are separated from said flocculent-containing water flow; the improvement wherein said suspending and separating stages are formed as an integral unit having an inverted conical upper section with means for introducing the flocculent containing flow from said aggregating stage in a tangential direction adjacent the upper end thereof to centrifugally collect flocculated matter and separate said metallic particles therefrom, and means for removing the collected flocculated matter and effluent water from an interior point within said conical section; and a tubular section extending downwardly from the lower end of said conical section to receive the separated metallic particles therefrom with means for introducing said waste water feed flow into said tubular section to resuspend said separated particles in said feed flow; and said electrical aggregating section comprises an elongated chamber separate from said integral unit, said chamber having a plurality of oppositely charged electrode pairs arranged at intervals along the interior walls thereof, said electrodes being formed of insoluble electrically conductive material, conduit means for delivering said particle-containing feed flow from said tubular section to one end of said elongated chamber and conduit means for delivering the flocculent containing water flow from the opposite end of said elongated chamber to said introducing means for said inverted conical section.

2. An aggregation treatment apparatus for waste water as claimed in claim 1, wherein said electrically aggregating chamber is formed as an electrode tube having a plurality of opposed electrodes, said electrodes on one side being applied with the same polarity and those on the other side with an opposite polarity.

3. An aggregation treatment apparatus for waste water as claimed in claim 2, wherein said electrodes are made in the shape of stud bolts.

4. An aggregation treatment apparatus for waste water as claimed in claim 2, wherein said electrodes are made in the shape of plates.

5. An aggregation treatment apparatus for waste water as claimed in claim 1, wherein said inverted conical section is provided therein with a partition cylinder of a similar configuration and the treated liquid is introduced into a space between both said cylinders in a tangential direction.

6. An aggregation treatment apparatus for waste water as claimed in claim 1, wherein the upper conical sections of said separating stage is provided with an overflow gutter for discharging the flocculent containing treated water.

7. An aggregation treatment apparatus as in claim 1 including means for recycling the treated water for further treatment in said electrical aggregating stage.

* * * * *